United States Patent
Yamada

(10) Patent No.: US 10,312,800 B2
(45) Date of Patent: Jun. 4, 2019

(54) AC-DC CONVERTER

(71) Applicant: Fuji Electric Co., Ltd., Kanagawa (JP)

(72) Inventor: Ryuji Yamada, Tokyo (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days.

(21) Appl. No.: 16/123,282

(22) Filed: Sep. 6, 2018

(65) Prior Publication Data

US 2019/0103808 A1    Apr. 4, 2019

(30) Foreign Application Priority Data

Oct. 4, 2017    (JP) ................ 2017-194091

(51) Int. Cl.
H02M 1/42    (2007.01)
H02M 3/156    (2006.01)
(Continued)

(52) U.S. Cl.
CPC ........... H02M 1/4258 (2013.01); G05F 1/70 (2013.01); H02M 1/4225 (2013.01); H02M 3/156 (2013.01); H02M 7/25 (2013.01)

(58) Field of Classification Search
CPC ............ H02M 1/0032; H02M 1/4208; H02M 1/4258; H02M 3/155–3/158;
(Continued)

(56) References Cited

U.S. PATENT DOCUMENTS 7,102,341 B1    9/2006  Choudhury
7,135,845 B2    11/2006  Zverev et al.
(Continued)

FOREIGN PATENT DOCUMENTS

JP    2006-87288 A    3/2006
JP    2016-93001 A    5/2016

OTHER PUBLICATIONS

Brown et al., "PFC Converter Design with IR1150U One Cycle Control IC. Application Note AN-1077.", International Rectifier, [online], Published Jun. 2005, Searched Sep. 11, 2017, Internet (URL: HYPERLINK "https://www.infineon.com/dgdl/an-1077.pdf?fileId=5546d462533600a40153559563801007") cited in the related U.S. Appl. No. 16/056,168.).

(Continued)

*Primary Examiner* — Yemane Mehari
(74) *Attorney, Agent, or Firm* — Chen Yoshimura LLP

(57) ABSTRACT

An AC-DC converter that converts a rectified voltage of an AC power supply AC to a DC output voltage by switching ON and OFF a switching device and controls the switching device by using a command value for and a detected value of the DC output voltage as well as a detected value of a reactor current includes: a current sense resistor and a low-pass filter for detecting a rectified current; a proportional controller that multiplies the detected value of the rectified current by a prescribed gain; an output voltage command calculator such as a divider that calculates an output voltage command for the switching device on the basis of an output of the proportional controller; and a circuit that compares the output voltage command to a carrier signal in order to generate a gate signal for the switching device, wherein the prescribed gain is effectively adjusted on the basis of a difference signal between a command value for and a detected value of the DC output voltage.

20 Claims, 8 Drawing Sheets

(51) Int. Cl.
*G05F 1/70* (2006.01)
*H02M 7/25* (2006.01)

(58) Field of Classification Search
CPC .. H02M 3/1584; H02M 3/33592; H02M 7/25; H01L 25/03; H02J 9/062
USPC .......................................... 363/123, 125–127
See application file for complete search history.

(56) References Cited

U.S. PATENT DOCUMENTS

| | | | |
|---|---|---|---|
| 8,085,562 B2 | 12/2011 | Sisson | |
| 2005/0013076 A1 | 1/2005 | Zverev et al. | |
| 2006/0031736 A1 | 2/2006 | Fahlenkamp et al. | |
| 2006/0043956 A1 | 3/2006 | Clavette | |
| 2007/0103947 A1* | 5/2007 | Taguchi | H02M 1/12 363/45 |
| 2007/0182347 A1* | 8/2007 | Shteynberg | H05B 33/0815 315/312 |
| 2008/0130336 A1* | 6/2008 | Taguchi | H02M 1/4225 363/125 |
| 2009/0200803 A1* | 8/2009 | Ichinose | H02J 3/18 290/44 |
| 2009/0273330 A1 | 11/2009 | Sisson | |
| 2010/0066337 A1* | 3/2010 | Gong | H02M 1/4225 323/285 |
| 2012/0044728 A1* | 2/2012 | Yatsu | H02M 7/219 363/126 |
| 2015/0146458 A1* | 5/2015 | Lim | H02M 3/158 363/44 |

OTHER PUBLICATIONS

Brown et al., "PFC Converter Design with IR1150 One Cycle Control IC. Application Note AN-1077.", International Rectifier, [online], Published Jun. 2005, Searched Sep. 11, 2017, Internet (URL: HYPERLINK "https://www.infineon.com/dgdl/an-1077.pdf?fileld=5546d462533600a40153559563801007") (Mentioned in paragraph Nos. 7-8 and 13 of the as-filed specification and cited in the related U.S. Appl. No. 16/056,168.).
U.S. Appl. No. 16/056,168, filed Aug. 6, 2018.

* cited by examiner

AC-DC CONVERTER

BACKGROUND OF THE INVENTION

Technical Field

The present invention relates to an AC-DC converter such as a so-called power factor correction (PFC) circuit and to a technology for improving power factor (input power factor) by controlling an AC input current to be a sine wave having the same phase as an AC input voltage.

Background Art

FIG. 4 illustrates a PFC circuit described in Patent Document 1 which is driven using a one-cycle power factor control scheme as described below. In FIG. 4, REC is a diode rectifier circuit, L is a reactor, 100 is an integrated circuit, 120 is a voltage conversion circuit, 130 is a voltage-dividing circuit, Q1 is a semiconductor switching device such as a MOSFET, and $R_s$ is a current sense resistor.

The switching device Q1 is driven by a gate signal output from a terminal 8 of the integrated circuit 100, and the input power factor is kept at a value substantially equal to 1 by controlling the AC input current of the PFC circuit to have the same phase as an AC input voltage $V_{in}$. Here, the output current (the current of the reactor L) of this circuit is detected and converted to a voltage by the current sense resistor $R_s$ and then input to a terminal 3 of the integrated circuit 100.

FIG. 5 illustrates the internal configuration of the integrated circuit 100. Note that the terminal numbers 1 to 8 of the integrated circuit 100 illustrated in FIG. 4 respectively correspond to terminals 1 to 8 illustrated on the left and right sides of FIG. 5.

In FIG. 5, a current sense signal input to the terminal 3 is converted, by a transconductance amplifier 103 and a capacitor on the output side thereof, to the average value of the equivalent current of the reactor L with the high-frequency components removed and provided to an adder 104. Here, the capacitance of the capacitor on the output side of the transconductance amplifier 103 is set to a value which allows the terminal voltage of the capacitor to be treated as being substantially constant for a period of time approximately equal to one switching cycle.

Meanwhile, an error amplifier (transconductance amplifier) 101 outputs, from the terminal 5, a current proportional to the error between a DC output voltage command value $V_{REF}$ and a voltage detection value $V_{FB}$ from the voltage-dividing circuit 130 in FIG. 4. As illustrated in FIG. 4, the terminal 5 is connected to the voltage conversion circuit 120, which is constituted by two capacitors and a resistor. The voltage conversion circuit 120 takes as input the current output from the error amplifier 101 and applies a voltage $V_m$ to the terminal 5. In other words, the output voltage $V_m$ of the error amplifier 101 is generated by components such as the error amplifier 101 and the voltage conversion circuit 120.

The voltage of the terminal 5 of the integrated circuit 100 (that is, the output voltage $V_m$ of the error amplifier 101) is the amplified difference between the DC output voltage command value $V_{REF}$ and the voltage detection value $V_{FB}$. This voltage $V_m$ serves as a compensation voltage $V_{COMP}$ for correcting the average value of the equivalent current of the reactor L from which the high-frequency components are removed and is added to the output voltage of the transconductance amplifier 103 by the adder 104 in FIG. 5. This addition result is then input to the inverting input terminal of a PWM comparator 105.

Meanwhile, a transconductance amplifier 102 outputs a current corresponding to the output voltage $V_m$ of the error amplifier 101. This current charges a capacitor 108, thereby producing a ramp wave, and this ramp wave is input to the non-inverting input terminal of the PWM comparator 105. Moreover, the voltage of the capacitor 108 is reset by the inverted output of a flip-flop circuit 107 described below.

The output voltage of the transconductance amplifier 103 has a negative polarity when input to the adder 104. Therefore, as the current of the reactor L increases, the period during which the output of the PWM comparator 105 remains at a High level (that is, the period during which the switching device Q1 remains ON) becomes shorter, and the proportion of time during which an ON signal is not output to the switching device Q1 from the terminal 8 via the flip-flop circuit 107 increases.

Thus, the current of the reactor L becomes balanced at a certain point in time, and the magnitude of the current at this balance point becomes greater the greater the instantaneous output voltage of the rectifier circuit (diode rectifier circuit) REC in FIG. 4 is (because the increase rate in the current of the reactor L is proportional to the instantaneous output voltage of the rectifier circuit (diode rectifier circuit) REC). As a result, the current of the reactor L and ultimately the AC input current becomes a sine wave similar to and having the same phase as the AC input voltage.

FIG. 6 is a waveform diagram which illustrates the relationship between the compensation voltage $V_{COMP}$ and the ramp wave and is taken from Patent Document 1 and Non-Patent Document 1.

As described in these documents, in a one-cycle power factor control scheme, the slope of the ramp wave is adjusted proportionally to the output of the error amplifier 101 so that the amplitude of the ramp wave reaches the compensation voltage $V_{COMP}$ at the end of each switching cycle $T_s$. For example, for the compensation voltages $V_{COMP1}$ and $V_{COMP2}$ in FIG. 6, this approach would produce ramp waves 1 and 2.

Moreover, FIG. 7 is a waveform diagram illustrating the relationship between the ramp wave and the output voltage of the adder 104 and is substantially the same as the diagram illustrated in Non-Patent Document 1. The circuit in FIG. 5 described above can be regarded as being equivalent to a circuit which generates a gate signal by obtaining the intersection between the output voltage of the adder 104 and the ramp wave illustrated in FIG. 7.

In FIG. 7, a is a value proportional to the initial current of the reactor L when a switching cycle begins while in continuous current mode. Moreover, b is a value equivalent to the maximum current flowing through the reactor L immediately before the switching device Q1 switches OFF, and the average current for the period in which the switching device Q1 remains ON is equal to the average value of a and b in FIG. 7. As illustrated in FIG. 7, the greater the compensation voltage $V_{comp}$ (that is, $V_{REF}-V_{FB}$) is, the greater the amount of current that can be passed becomes, which means that $V_{FB}$ can be made to converge on $V_{REF}$.

Furthermore, the higher the AC input voltage $V_{in}$ is, the greater the slope of the output voltage of the adder 104 becomes. This causes the input current to change in accordance with the instantaneous value of the AC input voltage $V_{in}$, thereby making it possible to improve the input power factor.

Next, FIG. 8 illustrates the configuration of a PFC circuit disclosed in Patent Document 2.

In the main circuit in FIG. 8, AC is an AC power supply (a commercial power supply), C1 and C2 are capacitors, R1 to R4 are voltage-dividing resistors, D1 is a diode, LOAD is a load such as a DC/DC converter, and the rest of the components have the same reference characters as in FIG. 4.

Moreover, in a control circuit for switching the switching device Q1 ON and OFF, AVR is a voltage regulator (an Automatic Voltage Regulator) constituted by a proportional-integral (PI) controller or the like, ACR is a current regulator (an Automatic Current Regulator) constituted by a proportional (P) controller or the like, CMP is a comparator, and GD is a gate driver circuit.

In this conventional technology, a current $I_L$ amplitude command output from the voltage regulator AVR is multiplied with a voltage-divided value of a rectified voltage $V_r$ to obtain an $I_L$ instantaneous value command, which is then compared with the $I_L$ sense value to generate a corresponding output signal through the current regulator ACR. Then, the difference between the voltage-divided value of the rectified voltage $V_r$ and the output of the current regulator ACR is obtained as an output voltage instantaneous value command $V_{sw}*$, which is then compared with a carrier signal in order to generate a PWM waveform. This PWM waveform is then inverted and input to the gate driver circuit GD, which generates a gate signal for switching the switching device Q1 ON and OFF.

This conventional technology similarly makes it possible to improve the input power factor by controlling the AC input current $I_{in}$ to be a sine wave having the same phase as the AC input voltage $V_{in}$.

RELATED ART DOCUMENTS

Patent Documents

Patent Document 1: Japanese Patent Application Laid-Open Publication No. 2006-87288 (paragraphs [0015] to [0022], FIGS. 1 to 5, and the like)
Patent Document 2: Japanese Patent Application Laid-Open Publication No. 2016-93001 (paragraphs [0002] to [0015], FIGS. 3 to 5, and the like)

Non-Patent Document

Non-Patent Document 1: "PFC Converter Design with IR1150 One Cycle Control IC. Application Note AN-1077.", International Rectifier, [online], Published June 2005, Searched Sep. 11, 2017, Internet (URL: https://www.infineon.com/dgdl/an-1077.pdf?fileId=5546d462533600a40153559563801007)

SUMMARY OF THE INVENTION

In the PFC circuit described in Patent Document 2 and illustrated in FIG. 8, the voltage-divided value of the rectified voltage $V_r$ needs to be input to the control circuit, and therefore loss due to the voltage-dividing resistors R1 and R2 occurs continuously. In recent years, there has been demand for minimizing so-called standby power as much as possible, and it is preferable that even small resistive losses do not occur.

Meanwhile, the PFC circuit of Patent Document 1 as illustrated in FIGS. 4 and 5 does not use a rectified voltage $V_r$ for control purposes, thereby making it possible to avoid occurrence of standby power due to the voltage-dividing resistors, which is one disadvantage of the scheme described in Patent Document 2. Nonetheless, the scheme described in Patent Document 1 involves manipulating the amplitude (by changing the slope) of a ramp wave used as a carrier signal, which means that under certain conditions this amplitude can become relatively small. However, when the amplitude of the carrier signal becomes small, the effects of noise become more prominent when performing PWM operations, which results in increased distortion of the current waveform.

Therefore, the problem to be solved by the present invention is to provide an AC-DC converter which eliminates the need for a unit for detecting AC input voltage or a rectified voltage thereof and also makes it possible to, without manipulating the amplitude of a carrier signal, improve input power factor by controlling AC input current to be a sine wave. Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides an AC-DC converter that converts an AC power supply voltage to a DC output voltage of a prescribed magnitude with power factor regulation, including: a rectifying circuit that rectifies the AC power supply voltage to output a rectified voltage; a reactor that receives the rectified voltage; a semiconductor switching device connected in series to the reactor; a current detector that detects a rectified current flowing through the reactor; a proportional controller that multiplies the detected value of the rectified current by a prescribed gain; a voltage regulation unit that receives a detected value of the DC output voltage and a command value and that outputs an amplitude command that represents a difference between the command value and the detected value of the DC output voltage; an output voltage command calculator that calculates an output voltage command for the semiconductor switching device on the basis of an output of the proportional controller and the amplitude command outputted from the voltage regulation unit; and a drive signal generator that compares the output voltage command to a carrier signal so as to generate a drive signal for switching the semiconductor switching device ON and OFF; and the voltage regulation unit and the output voltage command calculator together function as a gain controlling unit that adjusts the prescribed gain on the basis of the difference between the command value and the detected value of the DC output voltage.

In the above-mentioned AC-DC converter, the semiconductor switching device may switch OFF when the output voltage command is greater than the carrier signal.

In the above-mentioned AC-DC converter, the voltage regulation gain controlling unit may include: a subtractor that receives the detected value of the DC output voltage and the command value as inputs and outputs a value obtained by subtracting the detected value of the DC output voltage from the command value; and a voltage regulator connected to an output of the subtractor a voltage controlling unit that works to make the detected value of the DC output voltage match the command value, and a gain determining circuit that reduces the prescribed gain as an output of the voltage controlling unit increases.

In the above-mentioned AC-DC converter, the output voltage command calculator may calculate the output voltage command such that the prescribed gain is effectively reduced as the output of the voltage regulator increases.

In the above-mentioned AC-DC converter, the output voltage command calculator may be a divider that divides the output of the proportional controller by the amplitude command outputted from the voltage regulation unit to generate the quotient as the output voltage command for the semiconductor switching device.

In the above-mentioned AC-DC converter, the output voltage command calculator may include a subtractor that outputs a differential of a constant value relative to the amplitude command outputted from the voltage regulation unit and a multiplier that multiplies the differential outputted from the subtractor with the output of the proportional controller.

The above-mentioned AC-DC converter may further include a low-pass filter between the current detector and the proportional controller so that the rectified current, as averaged over one switching cycle of the semiconductor switching device via the low-pass filter, is inputted to the proportional controller.

The present invention makes it possible to improve power factor without using voltage-dividing resistors to detect the AC power supply voltage or a rectified voltage thereof, thereby making it possible to improve efficiency by reducing resistive loss.

Moreover, the present invention does not rely on changing the amplitude of the carrier signal, and therefore there is no risk, unlike in Patent Document 1, that the current waveform is affected by noise due to the amplitude of the carrier signal becoming small. In other words, in the present invention, controlling the semiconductor switching device such that the duty cycle thereof is proportional to the detected value of the rectified current makes it possible to improve the power factor by controlling the AC input current to be a sine wave having the same phase as the AC input voltage.

It is to be understood that both the foregoing general description and the following detailed description are exemplary and explanatory, and are intended to provide further explanation of the invention as claimed.

DETAILED DESCRIPTION OF EMBODIMENTS

An embodiment of the present invention will be described with reference to figures.

Figure 1:
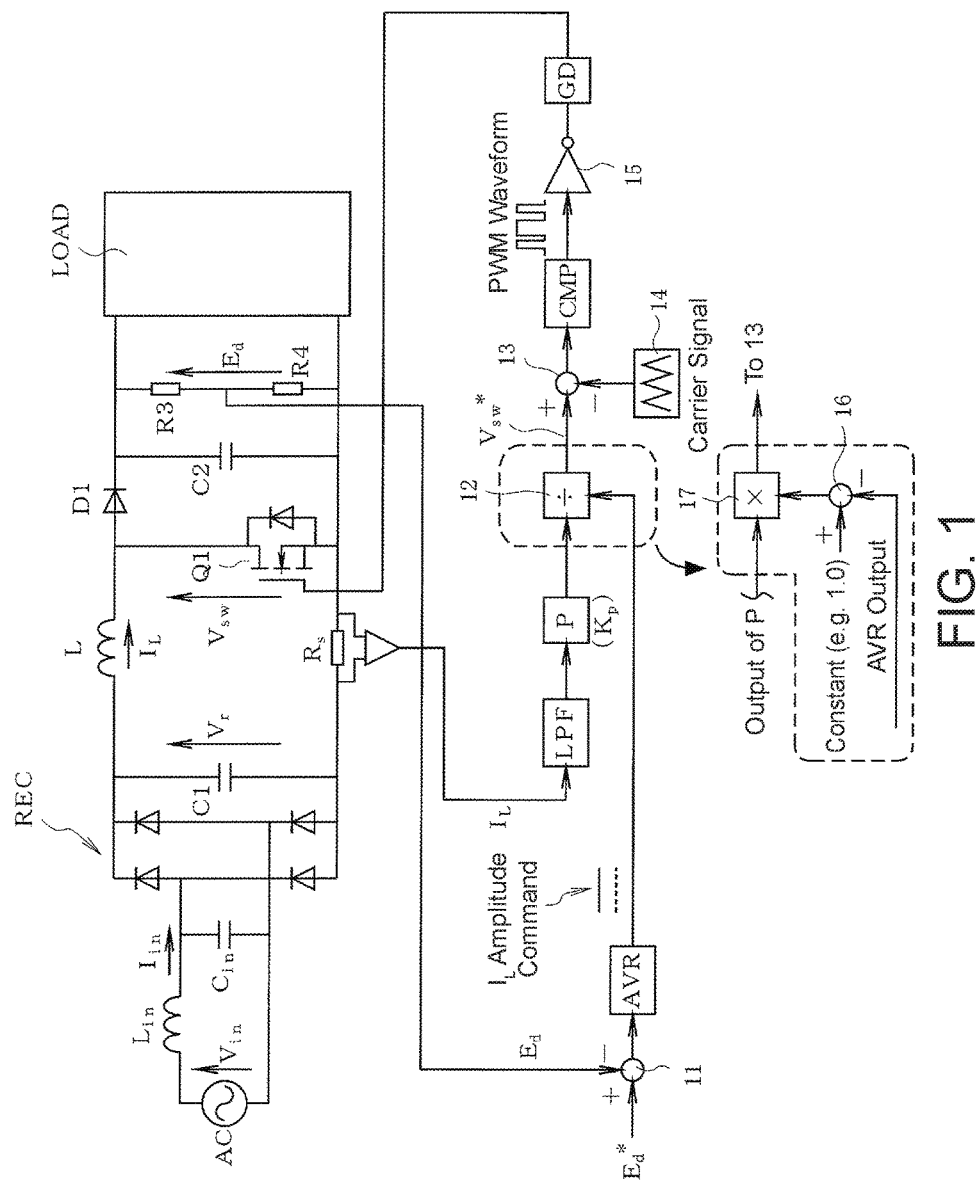
FIG. 1 is a block diagram illustrating the configuration of an embodiment of the present invention.

FIG. 1 is a block diagram of a PFC circuit for use as an AC-DC converter according to the embodiment of the present invention. The configuration of a main circuit in FIG. 1 is the same as in FIG. 8 except in that the voltage-dividing resistors R1 and R2 are removed. In other words, in the main circuit in FIG. 1, both terminals of an AC power supply (a commercial power supply) AC are connected, via an input filter constituted by a reactor $L_{in}$ and a capacitor $C_{in}$, to a diode rectifier circuit REC.

A capacitor C1 is connected between the positive and negative output terminals of the diode rectifier circuit REC, and a reactor L and a semiconductor switching device Q1 such as a MOSFET are connected in series to the both terminals of the capacitor C1. Moreover, a diode D1 and a capacitor C2 are connected in series to the both terminals of the semiconductor switching device Q1. A series circuit constituted by voltage-dividing resistors R3 and R4 is connected to the both terminals of the capacitor C2, and a load (LOAD) such as a DC-DC converter is connected to the both terminals of this series circuit.

Furthermore, a current sense resistor Rs for detecting a current (rectified current) $I_L$ flowing through the reactor L is connected between the source terminal of the semiconductor switching device Q1 and the negative electrode of the diode rectifier circuit REC.

Figure 8:
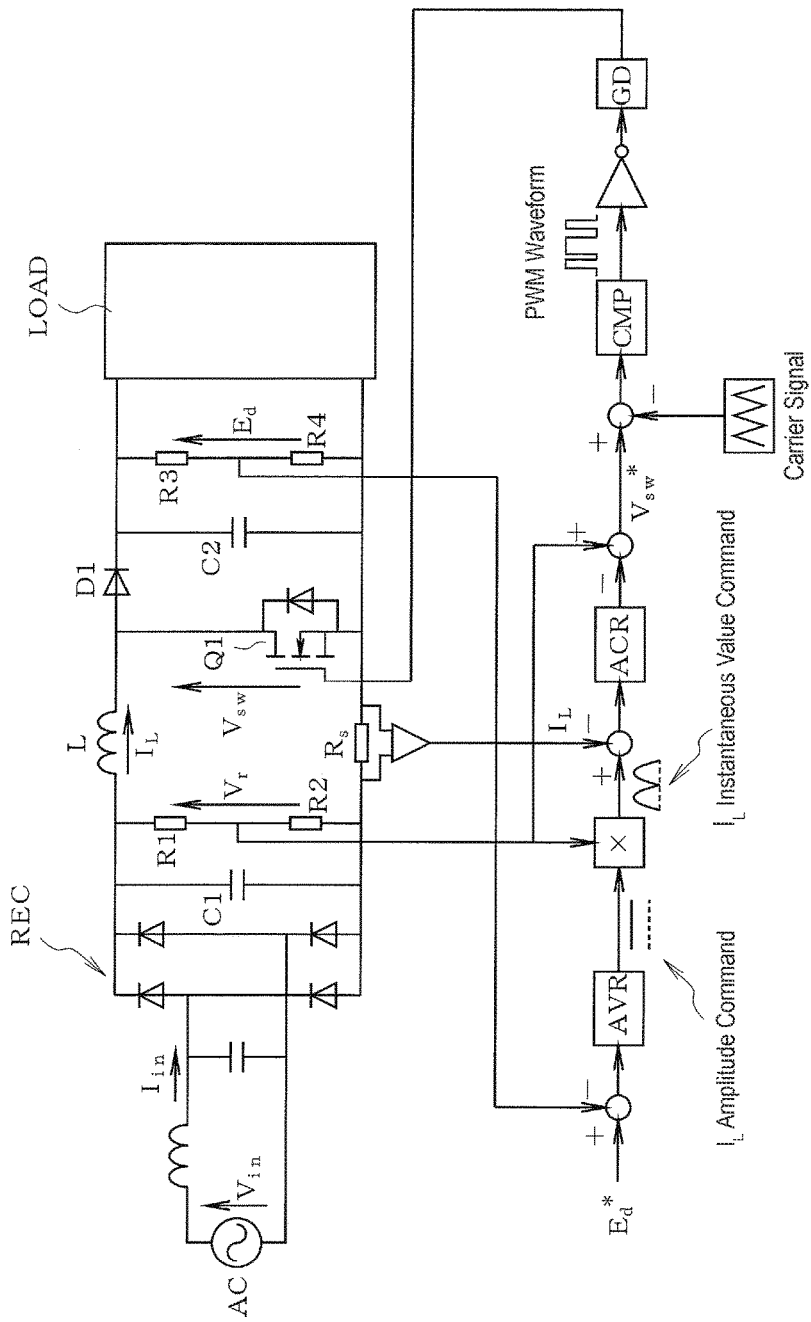
FIG. 8 illustrates the configuration of a PFC circuit disclosed in Patent Document 2.

Meanwhile, a control circuit is configured similar to the control circuit illustrated in FIG. 8 except in that the multiplier to which the output of the voltage regulator AVR is input, the subtractor to which the output of this multiplier is input, the current regulator ACR, and the subtractor to which the output of the current regulator ACR is input are removed, and a low-pass filter LPF, a proportional controller P, and a divider 12 are added.

In the control circuit illustrated in FIG. 1, a subtractor 11 calculates a voltage deviation between a DC output voltage $E_d$ (that is, a voltage-divided value thereof) detected by the voltage-dividing resistors R3 and R4 on the output side of the main circuit and a command value $E_d^*$. The voltage regulator AVR connected to the output side of this subtractor 11 is constituted by a PI controller or the like and outputs an amplitude command for the rectified current $I_L$. This voltage regulator AVR works so as to output a greater value of the rectified current $I_L$ amplitude command as the value obtained by subtracting the detected value from the DC output voltage command value increases, thereby serving to bring the abovementioned voltage deviation towards zero.

Moreover, the rectified current $I_L$ detected by the current sense resistor $R_s$ is input via the low-pass filter LPF to the proportional controller P, which in turn inputs the result of multiplying that current by a gain $K_p$ to the divider 12. Here, the low-pass filter LPF is a component for obtaining the average value of the current $I_L$ over a period of time corresponding to one switching cycle of the switching device.

The divider 12 divides the output value from the proportional controller P by the rectified current $I_L$ amplitude command (which is equivalent to adjusting the gain $K_p$ (described below) on the basis of the rectified current $I_L$ amplitude command) in order to calculate an output voltage command $V_{sw}^*$ proportional to an OFF time ratio α (described below). Thus, the divider 12 in this example functions as an output voltage command calculator that outputs the output voltage command $V_{sw}^*$. This output voltage command $V_{sw}^*$ is compared by a subtractor 13 and a comparator CMP to a carrier signal from a carrier signal generator 14 in order to generate a PWM waveform and corresponds to a value scaled to make the average value of $V_{sw}$ (which is approximately equal to $V_r$ and exactly equal to $\alpha \times E_d$) approximately equal to the amplitude of the carrier signal when $\alpha=1$ and $E_d$ is maximized. This PWM waveform is input via a sign inverter 15 to a gate driver circuit GD, which generates a gate signal for switching the switching device Q1 ON and OFF. Thus, in this embodiment, the subtractor 13, the CMP, the sign inverter 15, and the gate driver circuit GD together constitute a "drive signal generator" that generates a drive signal for switching the semiconductor switching device ON and OFF.

Here, the switching device Q1 switches OFF upon the output of the gate driver circuit GD taking an L level when the output voltage command $V_{sw}^*$ is greater than the carrier signal and switches ON upon the output of the gate driver circuit GD taking an H level when the output voltage command $V_{sw}^*$ is less than the carrier signal.

Next, the operation of the present embodiment will be described with reference to FIGS. 2 and 3.

In the present embodiment, the control circuit illustrated in FIG. 1 controls the gain $K_p$ of the proportional controller P such that the OFF time ratio $\alpha$ of the switching device Q1 remains proportional to the detected value of the rectified current $I_L$, as given in formula 1 below.

$$\alpha = K_p \cdot I_L \qquad \text{<Formula 1>}$$

Figure 2:
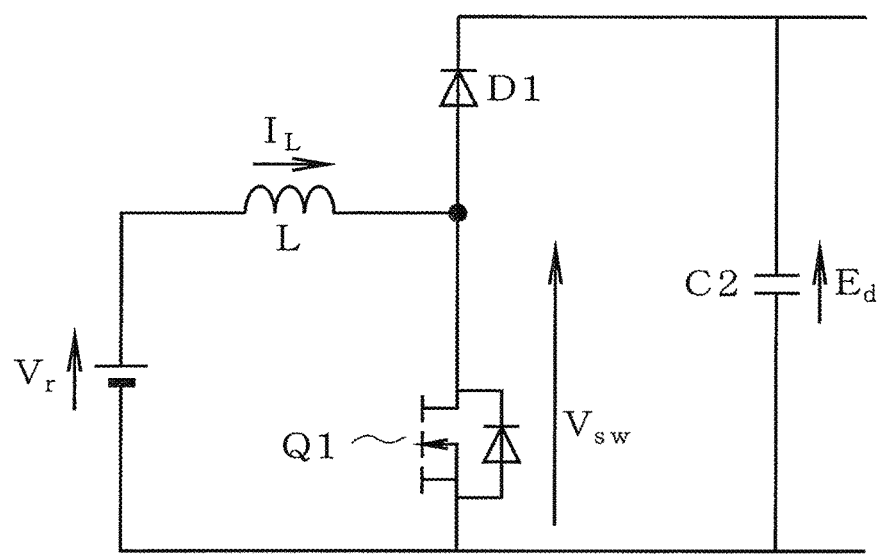
FIG. 2 is a circuit diagram illustrating a main portion of the configuration illustrated in FIG. 1.

FIG. 2 illustrates a main portion of the main circuit illustrated in FIG. 1. In FIG. 2, the terminal voltage of the reactor L (for which the inductance thereof is also L) is given by $V_r - V_{sw} = L(dI_L/dt)$, and thus the rectified current $I_L$ increases or decreases in accordance with the difference between $V_r$ and $V_{sw}$.

Here, $V_{sw}$ is the terminal voltage of the switching device Q1, which is equal to zero when the switching device Q1 is ON and is equal to the sum of the output voltage $E_d$ (the terminal voltage of the capacitor C2) and the forward voltage of the diode D1 when the switching device Q1 is OFF. When the output voltage $E_d$ is much greater than the forward voltage of the diode D1 ($E_d \gg$D1, this relationship holds when working with step-up circuits used to improve power factor), $V_{sw}$ can be treated as being equal to $E_d$ ($V_{sw} = E_d$) when the switching device Q1 is OFF.

Figure 3A:
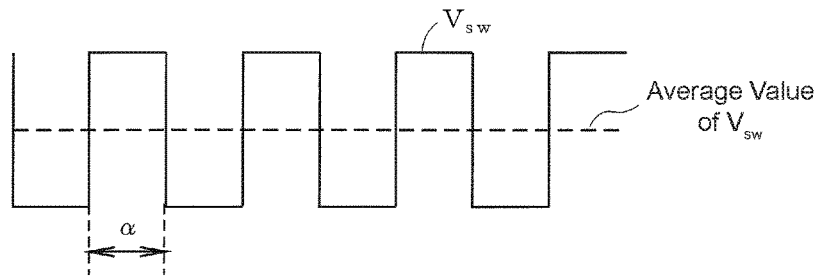
FIGS. 3A to 3D are waveform diagrams each illustrating operation of the embodiment of the present invention.

FIG. 3A shows the average value of $V_{sw}$, where a is the OFF time ratio of the switching device Q1 (and the unit time is equal to one switching cycle).

Based on formula 1, when the rectified current $I_L$ increases and the OFF time ratio $\alpha$ increases (that is, the average value of $V_{sw}$ increases), the ON time $t_{on}$ of the switching device Q1 decreases, thereby reducing the increase in $I_L$. Conversely, when $I_L$ decreases and the OFF time ratio $\alpha$ decreases (that is, the average value of $V_{sw}$ decreases), the ON time $t_{on}$ of the switching device Q1 increases, thereby reducing the decrease in $I_L$.

Figure 3B:
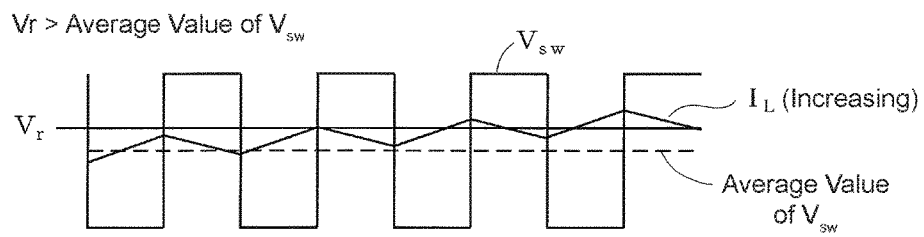
Figure 3C:
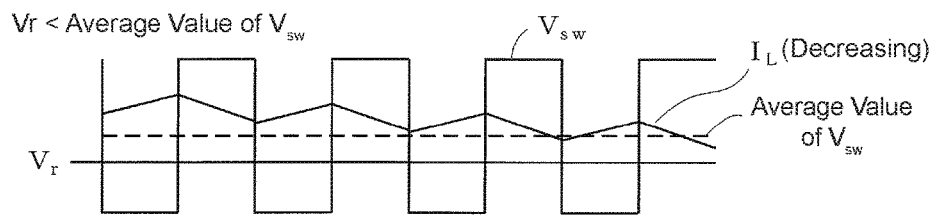
Figure 3D:
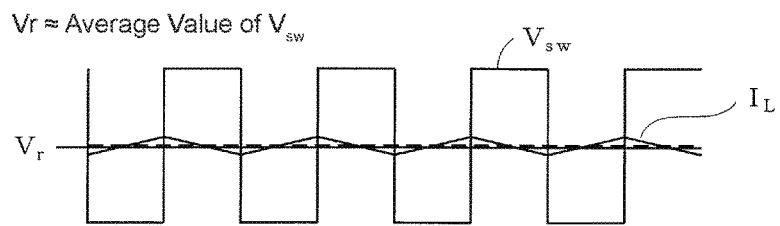
Figure 4:
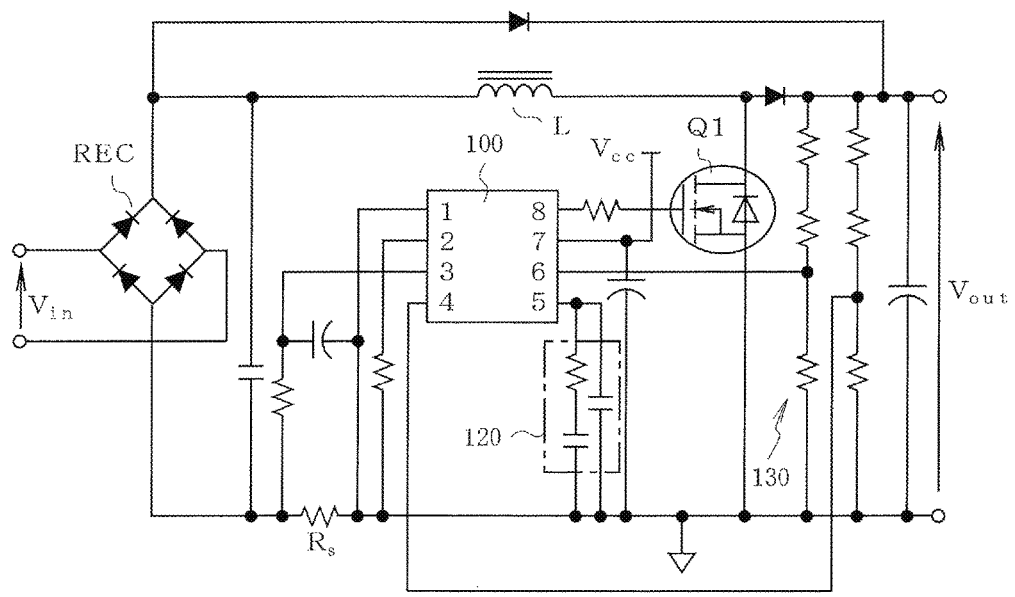
FIG. 4 illustrates the configuration of a PFC circuit disclosed in Patent Document 1.
Figure 5:
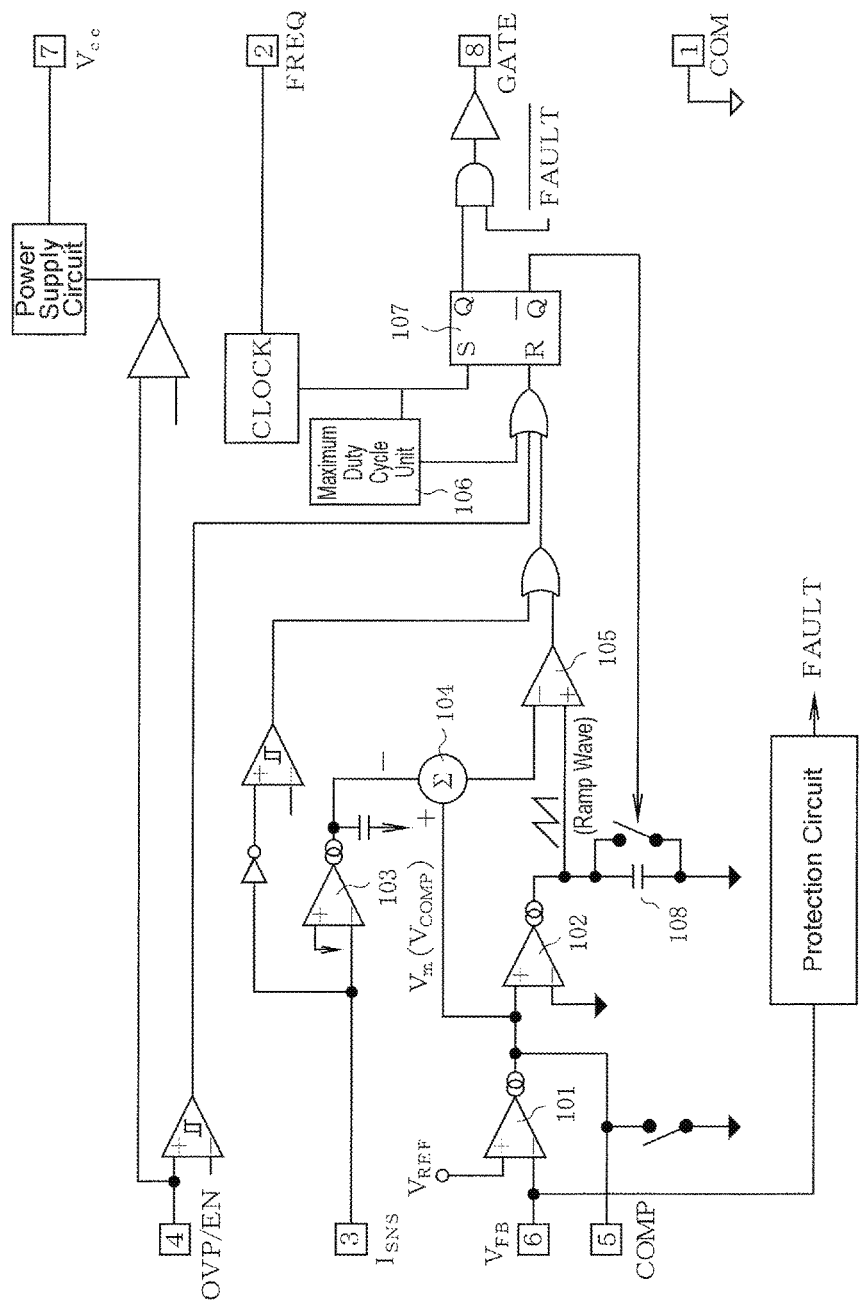
FIG. 5 illustrates the internal configuration of the integrated circuit in FIG. 4.
Figure 6:
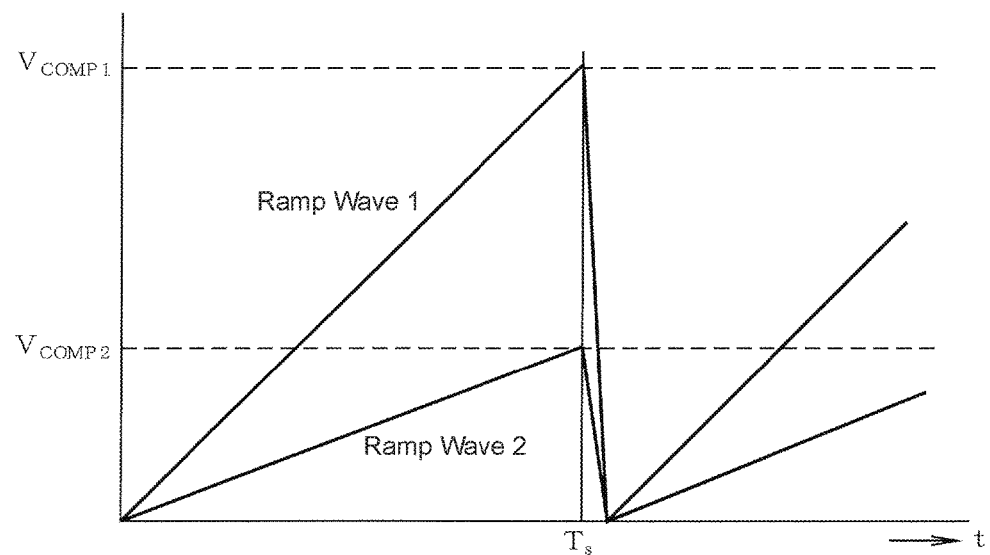
FIG. 6 is a waveform diagram illustrating the relationship between a compensation voltage and a ramp wave in FIG. 5.
Figure 7:
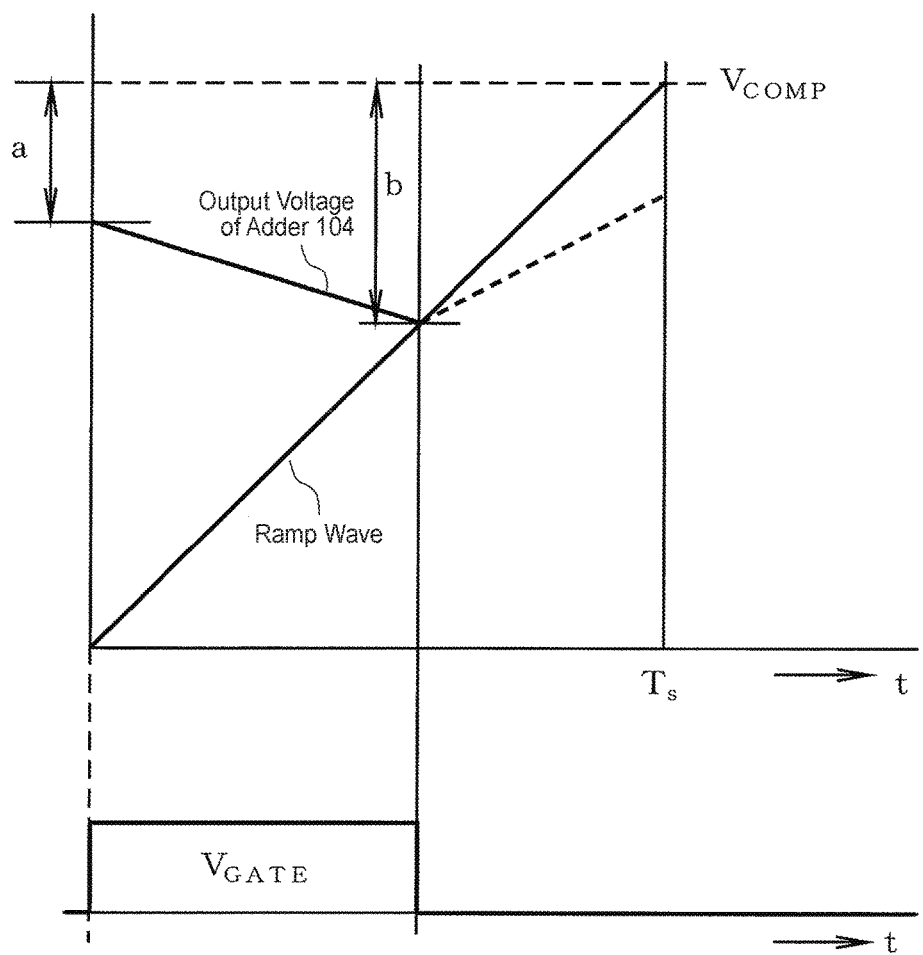
FIG. 7 is a waveform diagram illustrating the relationship between the ramp wave and an output voltage of an adder in FIG. 5.

Furthermore, FIGS. 3B, 3C and 3D illustrate the state of the current $I_L$ corresponding to different magnitude relationships between the rectified voltage $V_r$ and the average value of the terminal voltage $V_{sw}$ of the switching device Q1 for a case in which the OFF time ratio $\alpha$ is held constant (that is, the average value of $V_{sw}$ is held constant).

When $V_r$ is greater than the average value of $V_{sw}$, the current $I_L$ increases (FIG. 3B), and when $V_r$ is less than the average value of $V_{sw}$, the current $I_L$ decreases (FIG. 3C). Moreover, when $V_r$ is substantially equal to the average value of $V_{sw}$ (that is, $V_r \approx$ Average value of $V_{sw}$), the average value of the current $I_L$ remains substantially constant (FIG. 3D).

Note that although the details will not be described here, by assuming that in FIG. 3D the increase in the rectified current $I_L$ during the period corresponding to a and the decrease in the rectified current $I_L$ during the period other than the period corresponding to a are equal to one another, the relationship $V_r \approx$ Average value of $V_{sw} = \alpha \times E_d$ can be derived. In other words, the relationship given by formula 2 holds between $V_r$ and $\alpha$.

$$V_r = \alpha \cdot I_L \cdot E_d \qquad \text{<Formula 2>}$$

Formulas 3 and 4 below can thus be derived from formulas 1 and 2 above.

$$V_r = K_p \cdot I_L \cdot E_d \qquad \text{<Formula 3>}$$

$$I_L = V_r / K_p / E_d \qquad \text{<Formula 4>}$$

In formula 4, if $K_p$ is constant and the capacitance of the capacitor C2 in FIG. 1 is sufficiently large, the output voltage $E_d$ can also be treated as being substantially constant over a period of time approximately equal to one switching cycle of the switching device Q1, and therefore $I_L$ can be treated as being proportional to $V_r$.

Thus, $I_L$ takes a waveform shape similar to $V_r$, which is to say that the AC input current $I_{in}$ becomes a sine wave having the same phase as the AC input voltage $V_{in}$, thereby making it possible to control the input power factor to be substantially equal to 1.

Moreover, the divider 12, which is an output voltage command calculator, as described above, arranged between the proportional controller P and the subtractor 13 in FIG. 1 also functions as a gain determining circuit which adjusts the magnitude of the gain $K_p$ in accordance with the output of the voltage regulator AVR. Here, the subtractor 11, the voltage regulator AVR, and the divider 12 together form a "gain controlling unit."

In other words, as the difference between the DC voltage command value $E_d^*$ and the detected value $E_d$ increases and the output of the voltage regulator AVR therefore increases, the gain $K_p$ is set to be substantially smaller by the divider 12. From formula 3 above, $I_L$ is inversely proportional to $K_p$, and therefore when $K_p$ decreases, $I_L$ increases and causes a greater amount of power to be input. This in turn causes $E_d$ to increase such that the difference between $E_d$ and $E_d^*$ decreases.

As illustrated near the bottom of FIG. 1, in order to substantially reduce the magnitude of the gain $K_p$ as the output of the voltage regulator AVR increases, the output voltage command calculator may, instead of being constituted by the divider 12, be constituted by a subtractor 16 that takes as input a constant (such as 1.0) and the output of the voltage regulator AVR and a multiplier 17 that multiplies the output of the subtractor 16 with the output of the proportional controller P.

As described above, the present embodiment eliminates the need for a unit of the type described in Patent Document 2 for detecting AC input voltage or a rectified voltage thereof, thereby making it possible to reduce resistive loss. Moreover, the present embodiment makes it possible to, without manipulating the amplitude of the carrier signal as is done in the conventional technology described in Patent Document 1, improve the input power factor by controlling the AC input current to be a sine wave having the same phase as the AC input voltage.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. An AC-DC converter that converts an AC power supply voltage to a DC output voltage of a prescribed magnitude with power factor regulation, comprising:
   a rectifying circuit that rectifies the AC power supply voltage to output a rectified voltage;
   a reactor that receives the rectified voltage;
   a semiconductor switching device connected in series to the reactor;
   a current detector that detects a rectified current flowing through the reactor;
   a proportional controller that multiplies the detected value of the rectified current by a prescribed gain;
   a voltage regulation unit that receives a detected value of the DC output voltage and a command value and that outputs an amplitude command that represents a difference between the command value and the detected value of the DC output voltage;
   an output voltage command calculator that calculates an output voltage command for the semiconductor switching device on the basis of an output of the proportional controller and the amplitude command outputted from the voltage regulation unit; and
   a drive signal generator that compares the output voltage command to a carrier signal so as to generate a drive signal for switching the semiconductor switching device ON and OFF,
   wherein the voltage regulation unit and the output voltage command calculator together function as a gain controlling unit that adjusts the prescribed gain on the basis of the difference between the command value and the detected value of the DC output voltage.

2. The AC-DC converter according to claim 1, wherein the semiconductor switching device switches OFF when the output voltage command is greater than the carrier signal.

3. The AC-DC converter according to claim 1, wherein the voltage regulation unit includes:
   a subtractor that receives the detected value of the DC output voltage and the command value as inputs and outputs a value obtained by subtracting the detected value of the DC output voltage from the command value; and
   a voltage regulator connected to an output of the subtractor.

4. The AC-DC converter according to claim 2, wherein the voltage regulation unit includes:
   a subtractor that receives the detected value of the DC output voltage and the command value as inputs and outputs a value obtained by subtracting the detected value of the DC output voltage from the command value; and
   a voltage regulator connected to an output of the subtractor.

5. The AC-DC converter according to claim 3, wherein the output voltage command calculator calculates the output voltage command such that the prescribed gain is effectively reduced as the output of the voltage regulator increases.

6. The AC-DC converter according to claim 4, wherein the output voltage command calculator calculates the output voltage command such that the prescribed gain is effectively reduced as the output of the voltage regulator increases.

7. The AC-DC converter according to claim 1, wherein the output voltage command calculator is a divider that divides the output of the proportional controller by the amplitude command outputted from the voltage regulation unit to generate the quotient as the output voltage command for the semiconductor switching device.

8. The AC-DC converter according to claim 1, wherein the output voltage command calculator includes a subtractor that outputs a differential of a constant value relative to the amplitude command outputted from the voltage regulation unit and a multiplier that multiplies the differential outputted from the subtractor with the output of the proportional controller.

9. The AC-DC converter according to claim 2, wherein the output voltage command calculator is a divider that divides the output of the proportional controller by the amplitude command outputted from the voltage regulation unit to generate the quotient as the output voltage command for the semiconductor switching device.

10. The AC-DC converter according to claim 2, wherein the output voltage command calculator includes a subtractor that outputs a differential of a constant value relative to the amplitude command outputted from the voltage regulation unit and a multiplier that multiplies the differential outputted from the subtractor with the output of the proportional controller.

11. The AC-DC converter according to claim 3, wherein the output voltage command calculator is a divider that divides the output of the proportional controller by the amplitude command outputted from the voltage regulation unit to generate the quotient as the output voltage command for the semiconductor switching device.

12. The AC-DC converter according to claim 3, wherein the output voltage command calculator includes a subtractor that outputs a differential of a constant value relative to the amplitude command outputted from the voltage regulation unit and a multiplier that multiplies the differential outputted from the subtractor with the output of the proportional controller.

13. The AC-DC converter according to claim 4, wherein the output voltage command calculator is a divider that divides the output of the proportional controller by the amplitude command outputted from the voltage regulation unit to generate the quotient as the output voltage command for the semiconductor switching device.

14. The AC-DC converter according to claim 4, wherein the output voltage command calculator includes a subtractor that outputs a differential of a constant value relative to the amplitude command outputted from the voltage regulation unit and a multiplier that multiplies the differential outputted from the subtractor with the output of the proportional controller.

15. The AC-DC converter according to claim 5, wherein the output voltage command calculator is a divider that divides the output of the proportional controller by the amplitude command outputted from the voltage regulation unit to generate the quotient as the output voltage command for the semiconductor switching device.

16. The AC-DC converter according to claim 5, wherein the output voltage command calculator includes a subtractor that outputs a differential of a constant value relative to the amplitude command outputted from the voltage regulation unit and a multiplier that multiplies the differential outputted from the subtractor with the output of the proportional controller.

17. The AC-DC converter according to claim 6, wherein the output voltage command calculator is a divider that divides the output of the proportional controller by the amplitude command outputted from the voltage regulation unit to generate the quotient as the output voltage command for the semiconductor switching device.

18. The AC-DC converter according to claim 6, wherein the output voltage command calculator includes a subtractor that outputs a differential of a constant value relative to the amplitude command outputted from the voltage regulation unit and a multiplier that multiplies the differential outputted from the subtractor with the output of the proportional controller.

19. The AC-DC converter according to claim 1, further comprising a low-pass filter between the current detector and the proportional controller so that the rectified current, as averaged over one switching cycle of the semiconductor switching device via the low-pass filter, is inputted to the proportional controller.

20. The AC-DC converter according to claim 3, further comprising a low-pass filter between the current detector and the proportional controller so that the rectified current, as averaged over one switching cycle of the semiconductor switching device via the low-pass filter, is inputted to the proportional controller.

* * * * *